United States Patent [19]

Eilenberger et al.

[11] Patent Number: 5,369,514
[45] Date of Patent: Nov. 29, 1994

[54] MULTISTAGE SWITCHING FACILITY FOR OPTICAL SIGNALS

[75] Inventors: Gert Eilenberger, Kirchheim; Dietrich Böttle, Salach, both of Germany

[73] Assignee: Alcatel N.V., Amsterdam, Netherlands

[21] Appl. No.: 36,675

[22] Filed: Mar. 25, 1993

[30] Foreign Application Priority Data

Mar. 26, 1992 [DE] Germany ............................ 4209790

[51] Int. Cl.⁵ .................... H04J 4/00; H04J 14/00
[52] U.S. Cl. ...................... 319/123; 359/117; 359/128; 359/139; 385/17; 370/59
[58] Field of Search .......... 359/117, 123, 128, 139; 370/59, 63–64; 385/16–17

[56] References Cited

U.S. PATENT DOCUMENTS

| | | | |
|---|---|---|---|
| 4,701,907 | 10/1987 | Collins | 359/117 |
| 4,894,818 | 1/1990 | Fujioka et al. | 359/123 |
| 5,005,166 | 4/1991 | Suzuki et al. | 359/123 |
| 5,175,777 | 12/1992 | Bottle | 359/128 |
| 5,208,691 | 5/1993 | Nishio | 359/117 |
| 5,303,077 | 4/1994 | Böttle et al. | 359/123 |

OTHER PUBLICATIONS

M. Sakaguchi, et al, "Optical Switching Device Technologies", May 1987 IEEE Communications Magazine, vol. 25, No. 5.
J. S. Turner, "Design of a Broadcast Packet Network", Proceedings of INFOCOM '86, Apr. 1986, pp. 667 to 675.
D. W. Smith, et al, "Multidimensional Optical Switching Networks", IEEE 1989, pp. 0010 to 0013.
M. Schilling, et al, "Integrated Interferometric Injection Laser: Novel Fast and Broad-Band Tunable Monolithic Light Source", IEEE Journal of Quantum Electronics, vol. 27, No. 6, Jun. 1991, pp. 1615-1622.

*Primary Examiner*—Richard E. Chilcot, Jr.
*Assistant Examiner*—Kinfe-Michael Negash
*Attorney, Agent, or Firm*—Ware, Fressola, Van Der Sluys & Adolphson

[57] ABSTRACT

A multistage switching facility for optical signals where time conversions are only used in the last stage while only space and frequency conversions are used in the other stages. The last stage contains space, time and frequency position converters resulting in a facility in which no signal overtaking is possible when multiple routing is provided in the switching facility.

18 Claims, 2 Drawing Sheets

MULTISTAGE SWITCHING FACILITY FOR OPTICAL SIGNALS

TECHNICAL FIELD

The invention concerns a multistage switching facility for optical signals.

BACKGROUND OF THE INVENTION

One of the problems with optical switching technology is the intermediate storage of signals. To switch signals that are combined in the time multiplex, the time positions almost always require changing, and the signals must therefore be intermediately stored. With packet switching facilities, which are presently of particular interest in view of future ATM systems (ATM=Asynchronous Transfer Mode), intermediate storage must always be used when two packets, called cells in the ATM, are simultaneously ready for routing to a predetermined channel. Because of the traffic volume statistics, it cannot be excluded that two packets must be simultaneously routed in the same path.

From J. S. Turner's "Design of a Broadcast Packet Network", published in "Proceedings of INFOCOM '86" in April 1986, pages 667 to 675, it is known to combine several lines into a group within an ATM coupling network. Each of the lines of a group run parallel and are fully equivalent to each other. Aside from the fact that the capacity is increased in this instance, it is significant that the statistic traffic volume fluctuations are equalized, which lowers the number of necessary intermediate storage.

An ATM switching stage is known from DE 37 42 941 C2 (corresponds to U.S. Pat. No. 4,922,487, in which a fixed number of cells or packets to be switched are combined in a frame, all packets are divided into equally long packet parts and distributed into subframes. The switching takes place on the basis of subframes in the synchronous time multiplex. This makes use of the fact that all time channels in a line represent equivalent receiver channels, which equalizes most statistical fluctuations. The memory storage are those that must be used anyway with synchronous time multiplex switching. The storage space requirement in the coupling field is reduced by the frame: subframe ratio.

From D. W. Smith's et al "Multidimensional Optical Switching Networks", IEEE 1989, it is known to combine the known multiplex methods, in which wavelength and frequency multiplex belong to the time and space multiplex of the optical switching technology, in order to increase the capacity of an optical switching circuit. The addition of the wavelength or frequency multiplex as another dimension not only increases the capacity of the facility, as is desired in this instance, but it also increases the number of equivalent receiver channels to the same degree. However, very narrow limits have been established for the total capacity of this switching circuit.

A sufficient number of equivalent receiver channels equalizes the occurring statistical fluctuations, so that the intermediate storage can be omitted, except for those required to change the time positions in the time multiplex.

Changing the time position of an optical signal is associated with high costs. A basic possibility of realization consists in converting the optical signal into an electrical signal, to intermediately store it, and to reconvert it into an optical signal at the desired point in time.

At least for the present, bistable optical elements are excluded as the intermediate storage of whole ATM cells or whole frames in a synchronous multiplex. The only present possibility to intermediately store optical signals directly in the optical area lies in the use of time links, which are realized by optical fibers. Taking the length of intermediately stored signals into consideration, and the time during which the signals must be intermediately stored, fiber optic lengths on the order of 30 m to 25 km are required.

Furthermore, a conversion in time of an optical signal can basically not be avoided. On the one hand, every synchronization, which is not considered in this invention, is associated with conversion in time. On the other hand, with synchronous multiplex technology, the conversion to a very defined time position is the actual goal of the switching process, while with ATM, the avoidance of the collision in time of two ATM cells is one of the foremost goals of the switching process.

SUMMARY OF THE INVENTION

The invention has the task of presenting a multistage switching facility for optical signals, in which the cost of the time position conversion is small.

The task is fulfilled by a multistage switching facility for optical signals comprising space, time, and frequency position converters, characterized in that the time position converters are contained in the last stage of the multistage switching facility.

The basic idea of the invention consists in only undertaking time position conversions in the last stage, while working, in contrast, exclusively with space and frequency position conversions in the previous stages.

A solution is preferred in which all stages of the switching facility have both space position and frequency position converters, while the last stage also has time position converters.

The invention utilizes the above-mentioned fact, that several or even many equivalent channels always exist between the individual stages of a multistage switching facility. The appropriate design of the switching facility can ensure that one of these equivalent channels can be reached between the stages at any point in time. This can not be achieved by internal design at the output of the switching facility; for that reason, the possibility of intermediate storage in time must be provided in that area.

With the presently known concepts for multidimensional multistage optical switching facilities, the invention basically consists in omitting the time position converters, except in the last stage. The lack of time position conversion in the first stages is balanced by increasing the available frequency or space positions.

The equalization can be achieved, for example, when so many wavelengths (frequency positions) and so many lines (space positions) are used between the stages of the switching facility, that the product of the number of frequency positions and the number of space positions is about twice as large as the corresponding product before the first and after the last stage.

A switching facility constructed in accordance with the invention is especially well suited for a well known operating mode, in which the traffic volume is statistically scattered up to the middle stage, and from the middle stage on is switched to the desired output channel. In the ATM, if this statistic scatter is not used for individual connections but for individual cells, even short-term local overloads are thereby avoided. Since no time position conversions take place in the switching facility constructed according to the invention, the processing times are the same in all paths; the reciprocal passing of cells belonging to the same connection is therefore impossible. The installation on the output side usually required to reestablish the original sequence of belonging cells is not necessary in this instance. This produces a further enormous reduction in storage requirements.

BRIEF DESCRIPTION OF THE DRAWINGS

The following describes the invention in more detail by means of a configuration example, with the help of the enclosed drawings.

BEST MODE FOR CARRYING OUT THE INVENTION

Figure 1:
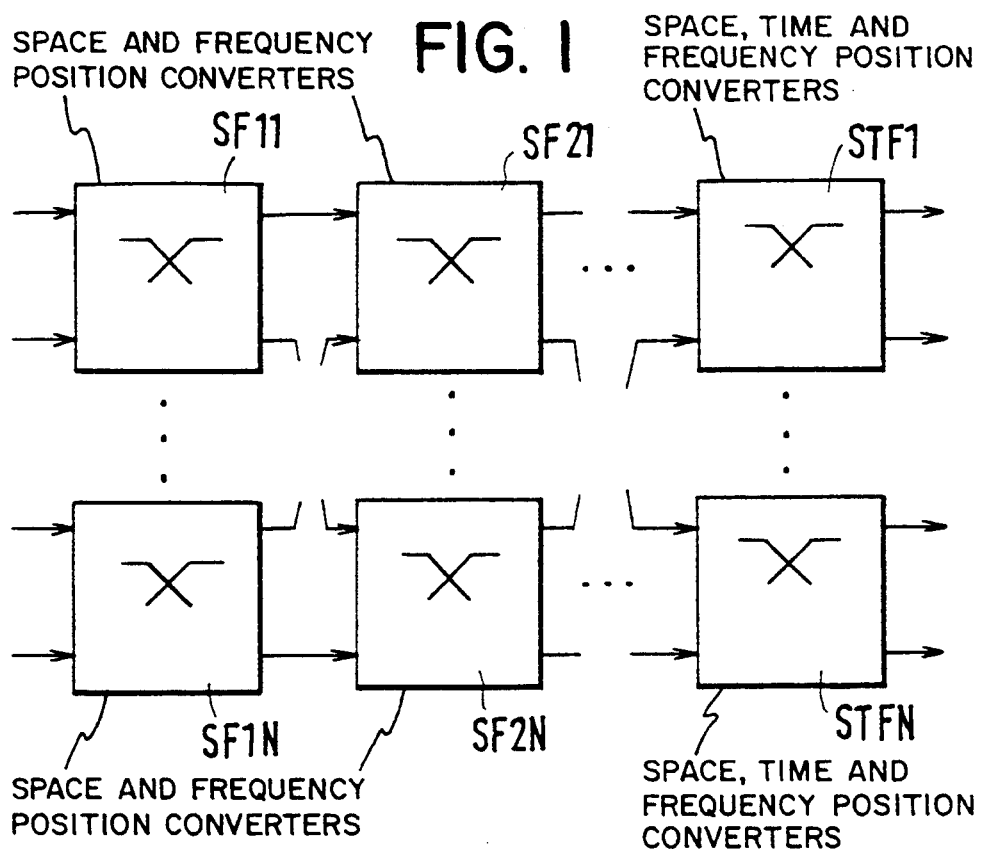
FIG. 1 shows a modular switching facility in accordance with the invention.

The switching facility according to FIG. 1 consists of a number of successive switching stages in the known manner, each of which has a number of equal modules. In the equally well known manner, the number of modules in each stage is a result of the number of inputs and outputs of the switching circuit, the number of inputs and outputs of a module and the traffic volume to be switched. The number of stages and the connection of the stages with each other is determined in the equally well known manner. An odd number of stages is preferred, in which exactly one path leads from each module of the first stage to each module of the middle stage, and from each module of the middle stage to each module of the last stage. Each such path can, and also must to a certain degree, have a number of equivalent channels. The channels may differ with respect to space position (optical line), frequency position (wavelength) and the time position.

In accordance with the invention, all modules, except for the modules of the last stage, are constructed as space and frequency position converter modules, SF11, SF1N, SF21, . . . , SF2N, . . . . The modules of the last stage are constructed as space, time and frequency position converter modules, STF1, . . . , STFN. It should only be mentioned in passing that the modules of the first stage take over other tasks, or that a preliminary stage is located upstream of the first stage for such other tasks. Such a task can consist, e.g. in halving the average traffic volume per channel, by doubling the number of channels, for example by doubling the available frequencies or operating wavelengths.

Both pure space and frequency position converter modules as well as combined space, time and frequency position converter modules are known to the professional.. For that reason the following only describes one of such modules as an example. In view of the modern realization of this module, the components called Y-laser because of their shape are pointed out, which can not only be used as light sources, but also as optical amplifiers, optical switches or wavelength converters. Among others, they were described by M. Schilling et al. as "Integrated Interferometric Injection Laser: Novel Fast and Broad-Band Tunable Monolithic Light Source", IEEE Journal of Quantum Electronics, Vol. 27, No. 6, June 1991, pp. 1616–1622.

Basically, all functions can be performed in the electrical instead of the optical domain, with the aid of electro-optical and opto-electrical converters. The different frequencies must then be replaced by other space positions, and must be taken into respective consideration for the conversion from or into the optical domain. Such a mixed utilization of optical and electrical signals can also be absolutely meaningful, because on the one hand, the means of processing electrical signals are generally known and well developed, and on the other, the optical transmission itself can be superimposed on a printed circuit board of the electrical transmission.

Figure 2:
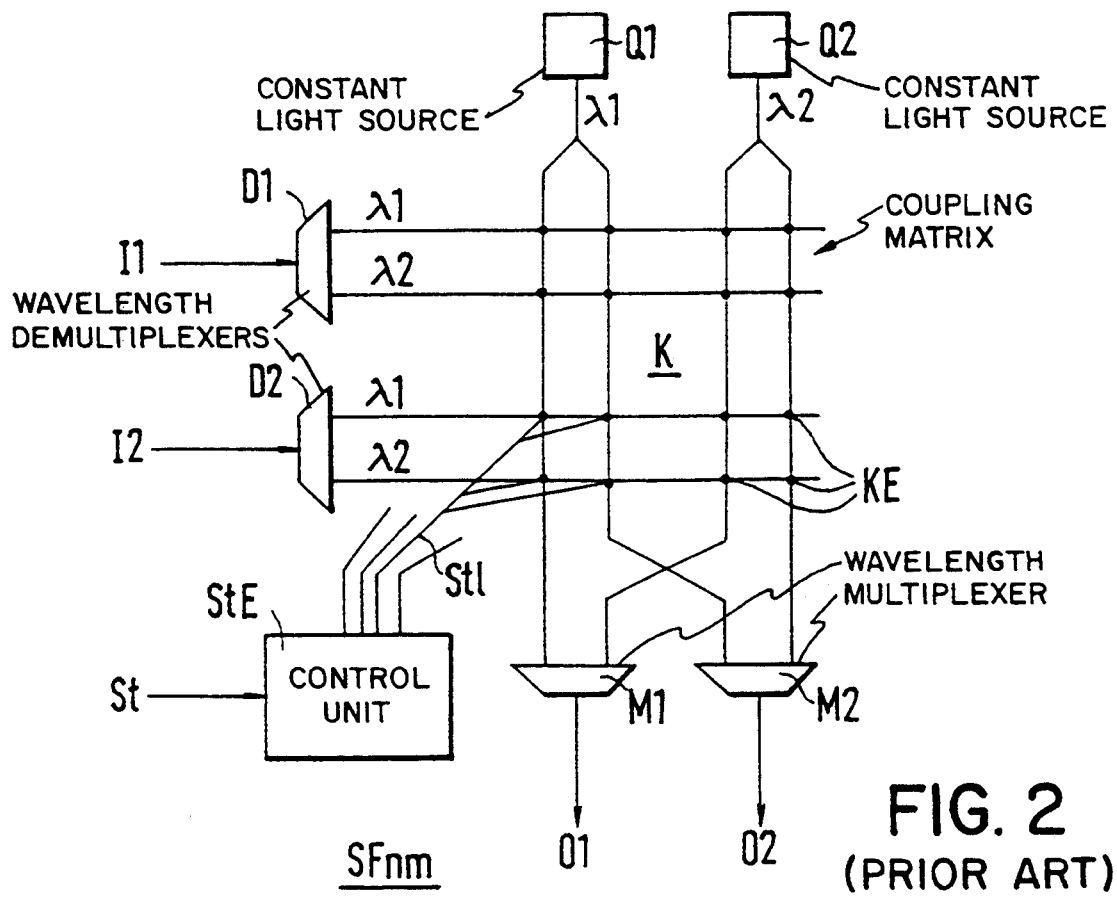
FIG. 2 shows an example of the construction of a module with space and frequency position conversion.

A space and frequency position conversion module that is suitable for the present invention was already described in DE 40 19 225.3 A1 (corresponds to U.S. Pat. No. 5,175,777). This space and frequency position conversion module SFnm, illustrated in FIG. 2 of the present invention, has two inputs I1 and I2, two outputs O1 and O2, two wavelength demultiplexers D1 and D2, two wavelength multiplexers M1 and M2, two constant light sources Q1 and Q2 and a coupling matrix K with coupling elements KE.

The SFnm module also contains a control unit StE with control lines Stl for guiding the coupling elements KE, and an external control line St for receiving the required control signals.

Two signals can be transmitted in the wavelength multiplex at each input and output. The operating wavelengths $\lambda 1$ and $\lambda 2$ are provided. The demultiplexers D1 and D2, which are located downstream of inputs I1 and I2, split the signals into the two wavelengths. A total of four separate signals are routed to the optical line conductors of the coupling matrix K.

The two constant light sources Q1 and Q2 work with the two operating wavelengths $\lambda 1$ or $\lambda 2$. Each constant light source supplies two column conductors of coupling matrix K.

The line and column conductors cross each other in the coupling elements KE. Each coupling element KE is built in such a way that, when in the not activated condition, it permits the light from the corresponding constant light source to pass without affecting it, and in the activated condition, it modulates this light with the signal from the corresponding line conductor. The switching between the activated and the not activated condition takes place with the cited means for controlling the coupling elements.

A column conductor leads from each constant light source Q1 and Q2 to each wavelength multiplexer M1 and M2. The wavelength multiplexers M1 and M2 are located upstream of outputs O1 or O2, and combine the arriving signals, which are modulated for the light of different operating wavelengths, into a common wavelength multiplex signal.

Thus, a signal path leads from each input I1 and I2 to each output O1 and O2, which can be switched on, or not, for each partial signal coming from the input, by activating a coupling element KE. By selecting the coupling elements, each partial signal arriving at one of the inputs can be switched to each of the outputs with or without wavelength conversion, where care must normally be taken that not more than one partial signal per operating wavelength is switched to each output, in other words, so that not more than one coupling element is activated for each column conductor at the same time.

The professional can easily recognize different possibilities of modifying the switching element described in FIG. 1. The following modifications are only provided as an example:

Each further input requires another demultiplexer, another line conductor per operating wavelength, and the other respective coupling elements.

Each further output requires another column conductor per operating wavelength, the other respective coupling elements, and another multiplexer.

Each further operating wavelength requires another output per demultiplexer and another line conductor, another constant light source, and another column conductor from the light source to each multiplexer, the other respective coupling elements, and another input per multiplexer.

As is known from conventional switching elements, the control signals, from which the signals for controlling the coupling elements are derived, can also be received by inputs I1 and I2. An additional wavelength can be used to that effect; this corresponds to a separate control channel in the time multiplex. However, the control signals can also be a component of the individual partial signals, in such a way for example, that control signals precede each communication being switched.

The coupling elements can also be switched dynamically. The particular idea is to configure the switching element for the transmission of ATM signals. Each partial signal consists of a series of ATM cells, which in turn consist of a cell head followed by a data part. The cell head contains information from which the subsequent path of the cell can be derived. As is usual in ATM, a control information for the dynamic control of the coupling elements can be derived therefrom. On the basis of this control information, a predetermined signal path is switched for the duration of an ATM cell, which, when required, causes the conversion of the wavelength.

Sufficient possibilities are available to the professional to realize the individual functions. For example, reference is made to the article "Optical Switching Device Technologies" by M. Sakaguchi and K. Kaede in the May 1987 IEEE Communications Magazine, Vol. 25, No. 5.

Filters may be used as simple demultiplexers, and couplers may be used as simple multiplexers. Elements that can be optically controlled and electrically activated are preferred as coupling elements. The above mentioned Y-laser is also recalled.

Figure 3:
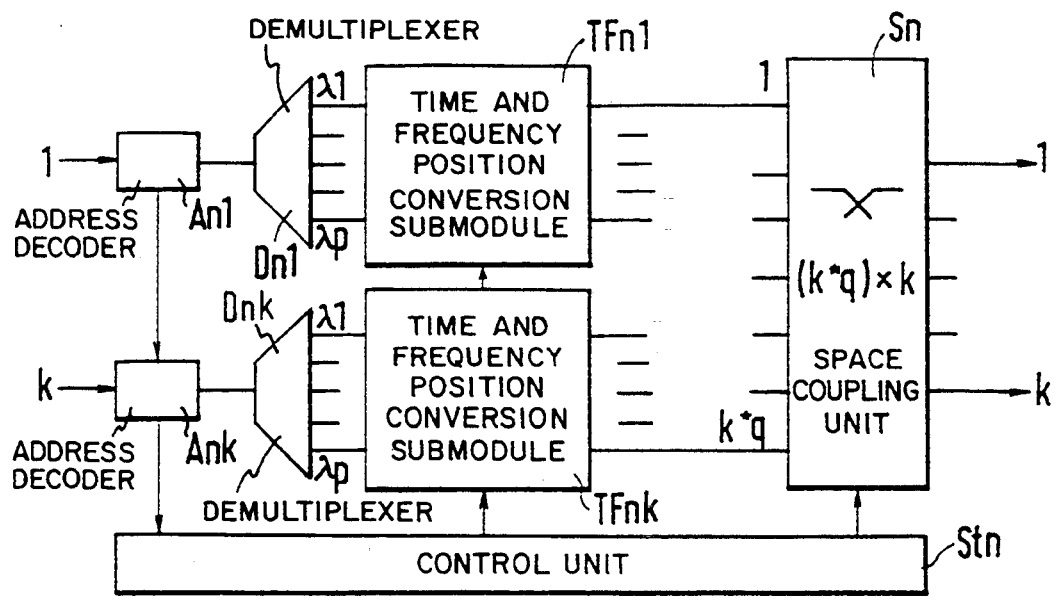
FIG. 3 shows an example of the construction of a module with space position conversion and sub modules with time and frequency position conversion.

The space, time and frequency position converter module STFn shown in FIG. 3 contains address decoders An1, . . . , Ank, wavelength demultiplexers Dn1, Dnk, submodule TFn1, . . . , TFnk with time and frequency position conversion, a space coupling unit Sn and a control unit Stn.

The STFn module has k optical input lines and k optical output lines. An address decoder, a demultiplexer and a submodule are allocated to each input line. The space coupling unit and the control unit are common to all input lines.

Each input line contains p optical signals, which are differentiated by their operating wavelengths $\lambda 1, \ldots, \lambda p$. The address decoders separate them in the respective input line with the address and control information contained therein and route them, preferably in electrical form, to the control unit. As described above for the space and frequency position converter module SFnm, the address and control information may be contained in an additional transmission channel with its own operating wavelength; in ATM, they may be a component of the signals being switched, in the cell head; they may also be modulated by the signals being switched through a special code. All of these possibilities are known by themselves, the present invention is independent thereof. A known, separate control network (control plane) may also be used in this instance.

The demultiplexers Dn1, . . . , Dnk separate the individual signals, which are differentiated by their operating wavelengths, from each other and now route p separated signals, or a total of p×k signals, to the k submodules. Each submodule converts these signals with respect to time and frequency position, as is required or possible for the output line of the switching facility. This produces a reduction, for example one half, of the number of operating wavelengths from p to q. The converted signals are routed to the space coupling unit Sn, still separated according to operating wavelengths.

The space coupling unit Sn comprises k×q inputs and k outputs. It is made up of 2×2 coupling elements in the usual manner. It has the peculiarity of having a simultaneous multiplexer function for signals with different wavelengths. However, aside from the asymmetrical construction, it is not a peculiarity of the space coupling unit itself, but a peculiarity of its control. Up to q inputs can be switched simultaneously to an output.

Figure 4:
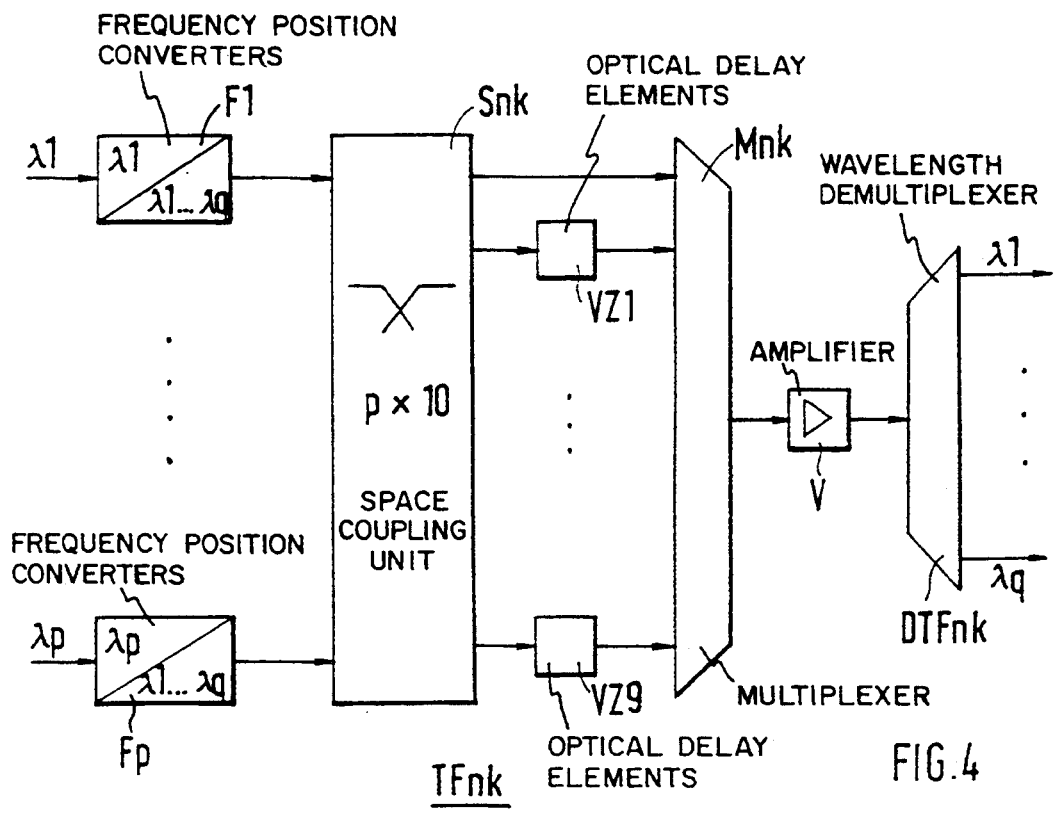
FIG. 4 shows the construction of a submodule according to FIG. 3.

The submodule TFnk shown in FIG. 4 contains p frequency position converters F1, . . . , Fp, a space coupling unit Snk, nine optical delay elements VZ1, . . . , VZ9, a multiplexer Mnk, an amplifier V and a wavelength demultiplexer DTFnk.

A signal with a predetermined operating wavelength $\lambda 1, \ldots, \lambda p$ is routed to each of the inputs of the frequency position converters F1, . . . , Fp. Each frequency position converter is able to convert the received signal, according to the control, to one of q predetermined operating wavelengths $\lambda 1, \ldots, \lambda q$. The frequency position converter may be a combination of opto-electrical converter and tunable laser, or the Y-laser mentioned earlier. The tuning is always performed by the control unit Stn.

The space coupling unit Snk has p inputs and 10 outputs. It is controlled by the control unit Stn. Each input is connected to the output of one of the frequency position converters F1, . . . , Fp. Each of the nine outputs of the space coupling unit is connected to one of the optical delay elements VZ1, . . . , VZ9. The delay elements are rolled up optical lines with a running time that corresponds to a multiple, namely one to nine times, the length of the time position. In ATM, the length of an ATM cell is equal to the length of a time position. Line lengths of 34.6 m and whole multiples thereof ensue for transmission velocities of 2.4 Gbit/s. Depending on the dimensions of the switching facility, and depending on which losses can still be tolerated, fewer delay elements may be sufficient (e.g. 5 for lower average traffic and higher permissible loss rates), or more delay elements may be required (e.g. 50 for higher average traffic and lower permissible loss rates).

The outputs of the delay elements, and the output of the space coupling unit Snk that is not connected to a delay element, are connected to the inputs of multiplexer Mnk. The space coupling unit Snk therefore has the task of connecting the outputs of the frequency position converters to that delay element, which manages the time position conversion required for the corresponding signal. In this space coupling unit as well, several inputs can be connected to the same output.

The multiplexer Mnk may be a simple fiber coupler. Its output is connected through amplifier V to the input of the wavelength demultiplexer DTFnk, which separates the signals with respect to their operating wavelengths $\lambda 1, \ldots, \lambda q$. As mentioned above, the outputs are routed to the inputs of space coupling unit Sn.

The control of the entire switching facility is not a subject of this invention. The task of creating the desired connection between an input channel and an output channel at any time, does not differ from that of any conventional switching facility. To fulfill this task, it is basically of no significance whether the switching takes place between frequency positions, time positions or space positions of equal value. The switching facility therefore does not require a control that is configured in accordance with the specifications of the invention.

We claim:

1. A multistage switching device, including at least two branches from inputs to outputs and crosslinks between the branches between any two subsequent stages, comprising:
   at least one stage having only space or frequency position converter means (SF11, ..., SF1N, SF21, ..., SF2N), responsive to optical signals, for providing space or frequency position converter signals; and
   a final stage having at least one time position converter means (STF1, ..., STFN), responsive to the space and frequency position converter signals, for providing time position converter signals.

2. A multistage switching device according to claim 1, wherein said final stage includes space, time and frequency position converter means (STF1, ..., STFN) for providing space, time and frequency position converter signals.

3. A multistage switching device according to claim 1, wherein said at least one stage includes space and frequency position converter means (SF11, ..., SF1N, SF21, ..., SF2N) for providing space and frequency position converter signals, and wherein said final stage includes space, time and frequency position converter means (STF1, ..., STFN) for providing space, time and frequency position converter signals.

4. A multistage switching device, comprising:
   at least one stage having only space and frequency position converter means (SF11, ..., SF1N, SF21, ..., SF2N), responsive to optical input signals, for providing space and frequency position converter signals; and
   a final stage having at least one time position converter means (STF1, ..., STFN), each responsive to the space and frequency position converter signals, for providing time position converter output signals.

5. A multistage switching device according to claim 4, wherein said final stage includes space, time and frequency position converters (STF1, ..., STFN) for providing space, time and frequency position converter output signals.

6. A multistage switching device according to claim 4, wherein the multistage switching device includes at least two branches from inputs to outputs and crosslinks between the branches between any two subsequent stages.

7. A multistage switching device according to claim 4, wherein the multistage switching device includes at least two branches from inputs to outputs and crosslinks between the branches between any two subsequent stages, and wherein each of said final stage is a space, time and frequency position converter (STF1, ..., STFN) for providing space, time and frequency position converter output signals.

8. A multistage switching means, comprising:
   at least one stage having space and frequency position converter means (SF11, ..., SF1N, SF21, ..., SF2N), responsive to optical signals, for providing space and frequency position converter signals;
   a final stage having space, time and frequency position converter means (STF1, ..., STFN), responsive to the space and frequency position converter signals, for providing space, time and frequency position converter signals.

9. A multistage switching device according to claim 8, wherein the multistage switching device includes at least two branches from inputs to outputs and crosslinks between the branches between any two subsequent stages.

10. A multistage switching means according to claim 8, wherein said space and frequency position converter means (SF11, ..., SF1N, SF21, ..., SF2N) further comprises:
    wavelength demultiplexer means (D1, D2), responsive to optical input signals (I1, I2), for providing wavelength demultiplexed signals;
    constant light source means (Q1, Q2), for providing constant light source signals;
    control unit means (StE), responsive to external control line signals (St), for providing control line signals (Stl);
    coupling matrix means (K), responsive to the wavelength demultiplexed signals, the constant light source signals and the control line signals (Stl), for providing coupling matrix signals; and
    wavelength multiplexer means (M1, M2), responsive to the coupling matrix signals, for providing wavelength multiplexed signals (O1, O2).

11. A multistage switching means according to claim 10, wherein said coupling matrix means (K) includes coupling elements (KE).

12. A multistage switching means according to claim 10, wherein the optical input signals (I1, I2) are the optical signals received by the multistage switching means.

13. A multistage switching means according to claim 10, wherein the wavelength multiplexed signals (O1, O2) are the space and frequency position converter signals provided by said at least one space and frequency position converter means (SF11, ..., SF1N, SF21, ..., SF2N).

14. A multistage switching means according to claim 8, wherein said space, time and frequency position converter means (STF1, ..., STFN) further comprises:
    address decoder means (An1, ..., Ank), responsive to optical input signals (1, ..., k), for providing address decoded signals;
    demultiplexers (Dn1, ..., Dnk), responsive to the address decoded signals, for providing demultiplexed signals;
    control unit means (Stn) for providing control signals;

time and frequency position conversion submodule means (TFn1, ..., TFnk), responsive to the demultiplexed signals and the control signals, for providing time and frequency position conversion submodule signals (1, ..., kq); and space coupling means, responsive to the time and frequency position conversion submodule signals (1, ... kq), for providing space coupling signals (1, ..., k).

15. A multistage switching means according to claim 14, wherein the optical input signals (1, ..., k) are the space and frequency position converter signals provided by said at least one space and frequency position converter means (SF11, ..., SF1N, SF21, ..., SF2N).

16. A multistage switching means according to claim 14, wherein the space coupling signals (1, ..., k) are the space, time and frequency position converter signals provided by said at least one space, time and frequency position converter means (STF1, ..., STFN).

17. A multistage switching means according to claim 14, wherein said time and frequency position conversion submodule means (TFn1, ..., TFnk) further comprises:

frequency position converter means (F1, ..., Fp), responsive to the demultiplexed signals, for providing frequency position converter signals;

space coupling means (Snk), responsive to the frequency position converter signals, for providing space coupling signals;

optical delay means (VZ1, ..., VZ9), responsive to the space coupling signals, for providing optical delay signals;

multiplexer means (Nmk), responsive to the optical delay signals, for providing multiplexed signals;

amplifier means (V), responsive to the multiplexed signals, for providing amplified signals; and wavelength demultiplexer means (DTFnk), responsive to the amplified signals, for providing wavelength demultiplexed signals.

18. A multistage switching means according to claim 17, wherein the wavelength demultiplexed signals are the time and frequency position conversion submodule signals (1, ..., kq).

* * * * *

UNITED STATES PATENT AND TRADEMARK OFFICE
CERTIFICATE OF CORRECTION

PATENT NO. : 5,369,514
DATED : November 29, 1994
INVENTOR(S) : Eilenberger et al It is certified that error appears in the above-indentified patent and that said Letters Patent is hereby corrected as shown below:

At column 9, line 5 (claim 14, line 16), please change "(1, ..., kq)" to --(1, ..., k*q)--; and at line 8 (claim 14, line 19), please change "(1, ... kq)" to --(1, ..., k*q)--.

At column 10, line 22 (claim 18, line 4), please change "(1, ..., kq)" to --(1, ..., k*q)--.

Signed and Sealed this

Eighteenth Day of April, 1995

Attest:

BRUCE LEHMAN

Attesting Officer

*Commissioner of Patents and Trademarks*